United States Patent
Kawahara

(10) Patent No.: US 8,611,426 B2
(45) Date of Patent: Dec. 17, 2013

(54) IMAGE-SENSING APPARATUS

(75) Inventor: Norihiro Kawahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1999 days.

(21) Appl. No.: 11/471,329

(22) Filed: Jun. 20, 2006

(65) Prior Publication Data

US 2007/0003151 A1   Jan. 4, 2007

(30) Foreign Application Priority Data

Jun. 29, 2005  (JP) ................................. 2005-190503

(51) Int. Cl.
*H04N 7/12* (2006.01)

(52) U.S. Cl.
USPC ............ 375/240.24; 375/240.01; 375/240.23; 375/240.26; 375/240.27; 375/240.28; 375/240.29; 348/488

(58) Field of Classification Search
USPC ........................................ 375/240.01–240.29
See application file for complete search history.

(56) References Cited

U.S. PATENT DOCUMENTS

| | | | | |
|---|---|---|---|---|
| 4,302,775 A | * | 11/1981 | Widergren et al. ...... | 375/240.06 |
| 5,467,129 A | * | 11/1995 | Suzuki ........................ | 348/231.6 |
| 5,621,477 A | * | 4/1997 | Demmer ...................... | 348/639 |
| 7,672,369 B2 | * | 3/2010 | Garakani et al. ......... | 375/240.01 |
| 2005/0078186 A1 | * | 4/2005 | Kreiner et al. ............... | 348/152 |

FOREIGN PATENT DOCUMENTS

| | | |
|---|---|---|
| JP | 03-230691 A | 10/1991 |
| JP | 06-086147 | 3/1994 |
| JP | 06-268896 | 9/1994 |
| JP | 2000-134622 | 5/2000 |
| JP | 2000-278683 | 10/2000 |
| JP | 2001-268580 A | 9/2001 |
| JP | 2002-064790 | 2/2002 |
| JP | 2002-176650 A | 6/2002 |
| JP | 2003-199102 A | 7/2003 |
| JP | 2003-219368 A | 7/2003 |
| JP | 2003-337280 | 11/2003 |
| JP | 2004-072655 A | 3/2004 |
| JP | 2004-134939 | 4/2004 |

OTHER PUBLICATIONS

The above reference was cited in a Jun. 18, 2010 Japanese Office Action, which is enclosed without English Translation, that issued in Japanese Patent Application No. 2005-190503.
The above foreign patent documents were cited in a Dec. 3, 2010 Japanese Office Action, which is enclosed without an English Translation, that issued in Japanese Patent Application No. 2005-190503.
The above foreign patent documents were cited in a Mar. 19, 2012 Japanese Office Action, which is enclosed without an English Translation, that issued in Japanese Patent Application No. 2011-019110.

* cited by examiner

*Primary Examiner* — Andy Rao
*Assistant Examiner* — Shan Elahi
(74) *Attorney, Agent, or Firm* — Cowan, Liebowitz & Latman, P.C.

(57) ABSTRACT

An image is divided into blocks, and each of the blocks is categorized as a block of interest or a block of non-interest. In signal processing in a camera signal processing unit (9), a block of interest is controlled using a parameter given by a main control unit (22) such that a larger amount of high-frequency components are left than in a block of non-interest. A compression/decompression processing unit (19) allocates a large amount of codes to a block of interest to effectively suppress a deterioration of image quality in a region of interest. There is provided an image-sensing apparatus which can compress an image into a limited amount of codes such that any deterioration of image quality is unnoticeable.

8 Claims, 7 Drawing Sheets

401

402

403

404

IMAGE-SENSING APPARATUS

FIELD OF THE INVENTION

The present invention relates to an image-sensing apparatus which applies compression encoding to an image sensed using an image-sensing device such as a CCD and, more particularly, to an image-sensing apparatus which can suppress a deterioration of image quality after compression.

BACKGROUND OF THE INVENTION

At the time of compression processing for video data in an image-sensing apparatus such as a digital camera or digital video camera, compression processing at a target bit rate (the amount of codes) as a base needs to be performed. At the same time, however, there is demand for efficient compression of data into a limited amount of codes with fine perceived resolution.

To meet the demand, Japanese Patent Laid-Open No. 2000-134622 (D1) proposes dividing an input image into regions, categorizing each region as a region of interest or a region of non-interest, and encoding the image while allocating a larger amount of codes to a region of interest than to a region of non-interest (encoding the region of interest at a higher bit rate), at the time of image compression. Note that in D1, each region is categorized as a region of interest or a region of non-interest based on region-of-interest information accompanying an input image and the luminance distribution in each divided block.

However, in the method described in D1, an input image is divided into regions, and each region is categorized as a region of interest or a region of non-interest, at the time of image compression. For this reason, there is no difference in signal processing before image compression between a region of interest and a region of non-interest. Examples of such signal processing before image compression include camera signal processes such as noise reduction processing for a signal output from an image-sensing device such as a CCD and aperture correction.

In other words, a signal to be subjected to compression encoding has undergone the same set of camera signal processes, regardless of whether the signal belongs to a region of interest or a region of non-interest. For this reason, a realizable image-quality improvement effect may not be obtained even if a larger amount of codes are allocated to each region of interest at the time of encoding.

SUMMARY OF THE INVENTION

The present invention has been made in consideration of the prior-art problem, and has as its object to provide an image-sensing apparatus which can compress an image to a limited amount of codes such that any deterioration of image quality is to be less represented.

According the present invention, the foregoing object is attained by providing an image-sensing apparatus comprising; a signal processing unit adapted to apply predetermined signal processing to sensed image data and outputs the image data; an encoding unit adapted to encode data output from the signal processing unit; a categorization unit adapted to categorize each of blocks of the image data as one of a block of interest and a block of non-interest on the basis of data acquired during processing of the signal processing unit; and a control unit adapted to control the signal processing applied by the signal processing unit on the basis of a categorization result obtained from the categorization unit, wherein the control unit controls the signal processing such that image data contained in the block of interest has a larger amount of high-frequency components left which are related to the amount of codes in the encoding than image data contained in the block of non-interest.

With this configuration, according to the present invention, there can be implemented an image-sensing apparatus which can compress an image to a limited amount of codes such that any deterioration of image quality is to be less represented.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

First Embodiment

The present invention will be explained in detail below on the basis of a preferred embodiment thereof with reference to the drawings.
(Overall Configuration of Video Camera)

Figure 1:
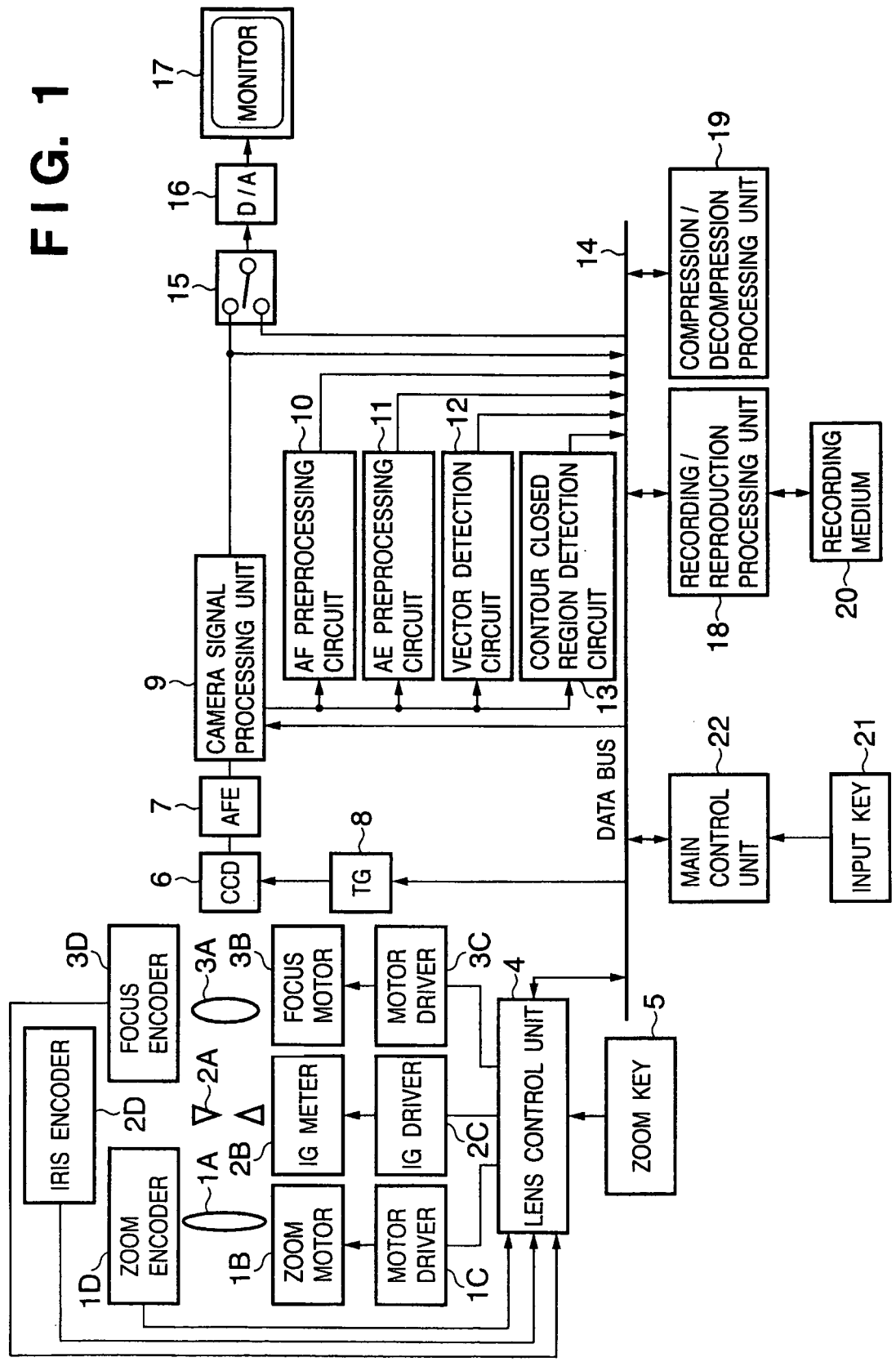
FIG. 1 is a block diagram representing an example of the configuration of a digital video camera as an image-sensing apparatus according to a first embodiment of the present invention.

FIG. 1 is a block diagram showing an example of the configuration of a digital video camera as an image-sensing apparatus according to a first embodiment of the present invention.

A zoom lens 1A, an iris 2A, and a focus lens 3A are driven by a zoom motor 1B, an IG meter 2B, and a focus motor 3B, respectively. The zoom motor 1B, IG meter 2B, and focus motor 3B are controlled in accordance with an instruction from a lens control unit 4 through a motor driver 1C, an IG driver 2C, and a motor driver 3C, respectively. The pieces of positional information of the zoom lens 1A, iris 2A, and focus lens 3A are detected by a zoom encoder 1D, an iris encoder 2D, and a focus encoder 3D, respectively, and supplied to the lens control unit 4. The pieces of positional information are used in various processes such as autofocus control.

Light beams having passed through the zoom lens 1A, iris 2A, and focus lens 3A form an image on a charge-coupled device (CCD) 6, which is an example of an image-sensing device, and electric charges are accumulated. The CCD 6 is driven in accordance with a timing signal output from a timing generator (TG) 8. Image signals are obtained by reading electric charges. The TG 8 controls a shutter (not shown) such that an appropriate amount of electric charge is accumulated in the CCD 6.

An analog front-end (AFE) circuit 7 performs, for the electrical signal for each pixel read from the CCD 6, reset noise removal, gain adjustment, analog-digital (A/D) conversion, and the like and generates a digital sensed-image signal. The digital sensed-image signal as an output from the AFE 7 is input to a camera signal processing unit 9.

(Camera Signal Processing Unit 9)

Figure 2:
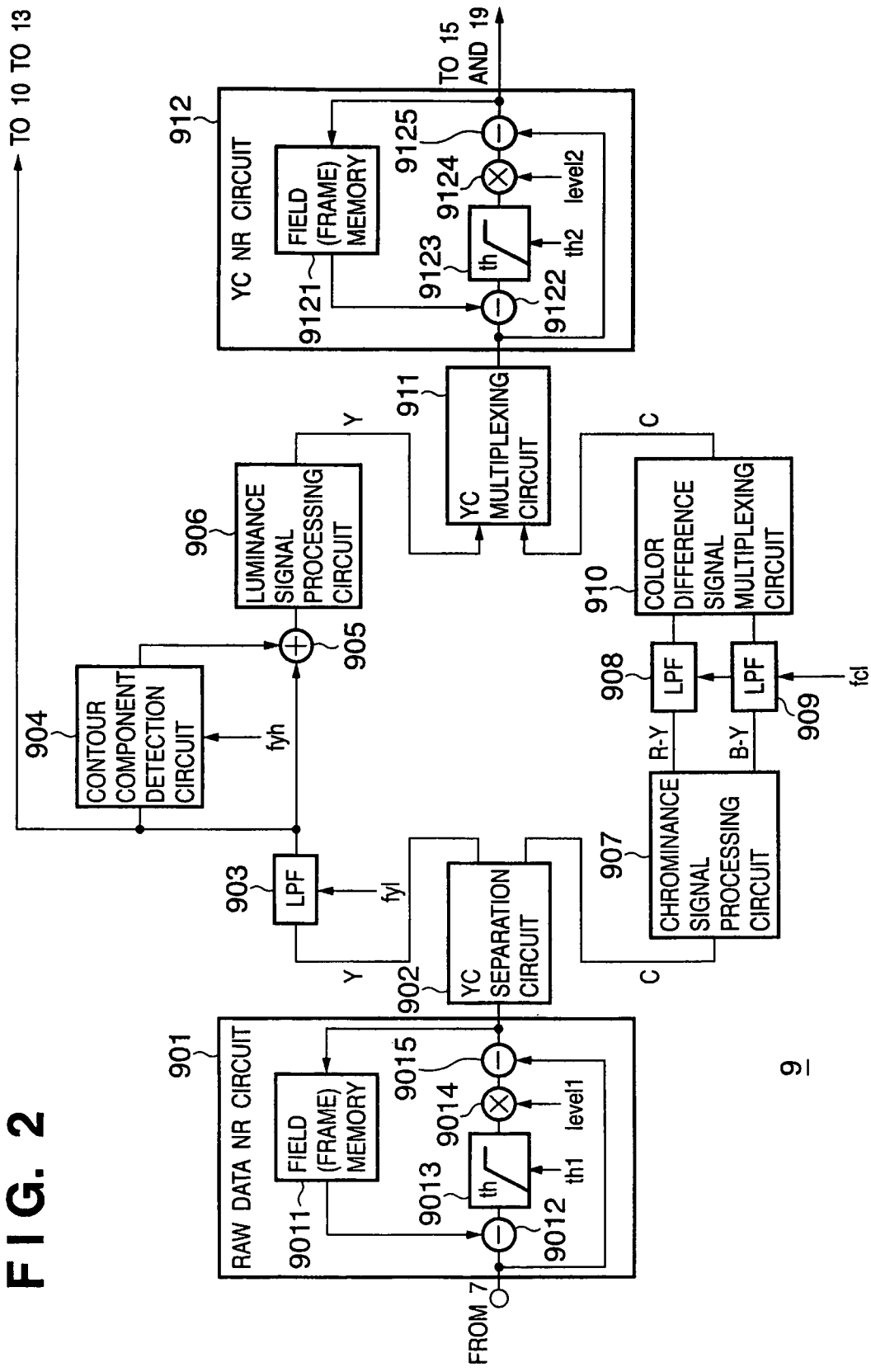
FIG. 2 is a block diagram representing an example of the internal configuration of a camera signal processing circuit in FIG. 1.

FIG. 2 shows an example of the configuration of the camera signal processing unit 9. A RAW data noise reduction (NR) circuit 901 is a cyclic type noise reduction circuit which performs field or frame cyclic noise reduction processing for an output from the AFE 7. If a memory 9011 is a frame memory, the RAW data NR circuit 901 performs frame cyclic NR processing. On the other hand, if the memory 9011 is a field memory, the RAW data NR circuit 901 performs field cyclic NR processing.

If signals output from the memory 9011 are video signals from which all noise components have been removed, signals output from a subtracter 9012 which subtracts outputs from the memory 9011 from outputs from the AFE 7 are noise components. An output from the subtracter 9012 is input to a limiter 9013 which has a threshold value th1 input from a main control unit 22 in FIG. 1 through a data bus 14. The limiter 9013 extracts a signal whose level is equal to or lower than the threshold value th1 as a noise component and outputs the signal to a multiplier 9014.

The multiplier 9014 multiplies a noise component by a cyclic coefficient level1 from the main control unit 22 in FIG. 1 and sends the product to a subtracter 9015. The subtracter 9015 subtracts, from a signal input from the AFE 7, an output from the multiplier 9014, thereby implementing noise reduction (NR) processing.

At this time, if the cyclic coefficient level1 ($0 \leq level1 \leq 1$) approaches the maximum value of 1, the proportion of ones to be removed to noise components contained in input video signals increases. This increases the effect of reducing noise. If the threshold value th1 supplied to the limiter 9013 increases, the levels of signals extracted as noise increase. This results in an increase in noise reduction effect.

An output from the RAW data NR circuit 901 is separated into a luminance component and chrominance components by filtering in a luminance/chrominance (YC) separation circuit 902.

A low pass filter (LPF) 903 limits the band of a luminance component Y obtained by separation in the YC separation circuit 902 to a frequency fyl set by the main control unit 22 and performs removal of chrominance carrier components and the like. At the same time, the LPF 903 extracts only necessary frequency components. An output from the LPF 903 is output to an AF preprocessing circuit 10, an AE preprocessing circuit 11, a vector detection circuit 12, a contour closed region detection circuit 13, and a contour component detection circuit 904. The contour component detection circuit 904 detects, from an output from the LPF 903, a contour (edge) component having, as a center frequency, a frequency fyh set by the main control unit 22 using a high pass filter (HPF) and outputs the component. An adder 905 adds an output from the contour component detection circuit 904 and an output from the LPF 903 and performs aperture correction. A luminance signal processing circuit 906 performs luminance signal-related processes such as gamma correction for an output from the adder 905.

In the meantime, a color component C obtained by separation in the YC separation circuit 902 is supplied to a chrominance signal processing circuit 907. The chrominance signal processing circuit 907 performs chrominance signal-related processes such as white balance correction and gamma correction and generates color difference signals (R-Y and B-Y). LPFs 908 and 909 limit the bands, respectively, of the color difference signals (R-Y and B-Y), which are outputs from the chrominance signal processing circuit 907, to a frequency fcl set by the main control unit 22. The LPFs 908 and 909 extract only necessary frequency components. A color difference signal multiplexing circuit 910 multiplexes the R-Y and B-Y components.

An output from the luminance signal processing circuit 906 and an output from the color difference signal multiplexing circuit 910 are multiplexed by a YC multiplexing circuit 911 and supplied to a YC noise reduction (NR) circuit 912. The YCNR circuit 912 operates in the same manner as the RAW data NR circuit 901 and performs NR processing for each of the multiplexed Y and C components. The main control unit 22 sets a threshold value th2 and a cyclic coefficient level2 in a limiter 9123 and a multiplier 9124, respectively.

An output from the YCNR circuit 912 is sent to a selector 15. The selector 15 selects an output from the YCNR circuit 912 at the time of video signal recording and an output from a compression/decompression processing unit 19 (actually, through the data bus 14) at the time of reproduction and outputs the selected output. An output from the selector 15 is converted into an analog signal by a digital-analog (D/A) converter 16 and displayed on a monitor 17. The monitor 17 such as an LCD can monitor a shot image or reproduced image.

(Compression/Decompression Processing Unit 19)

Figure 3:
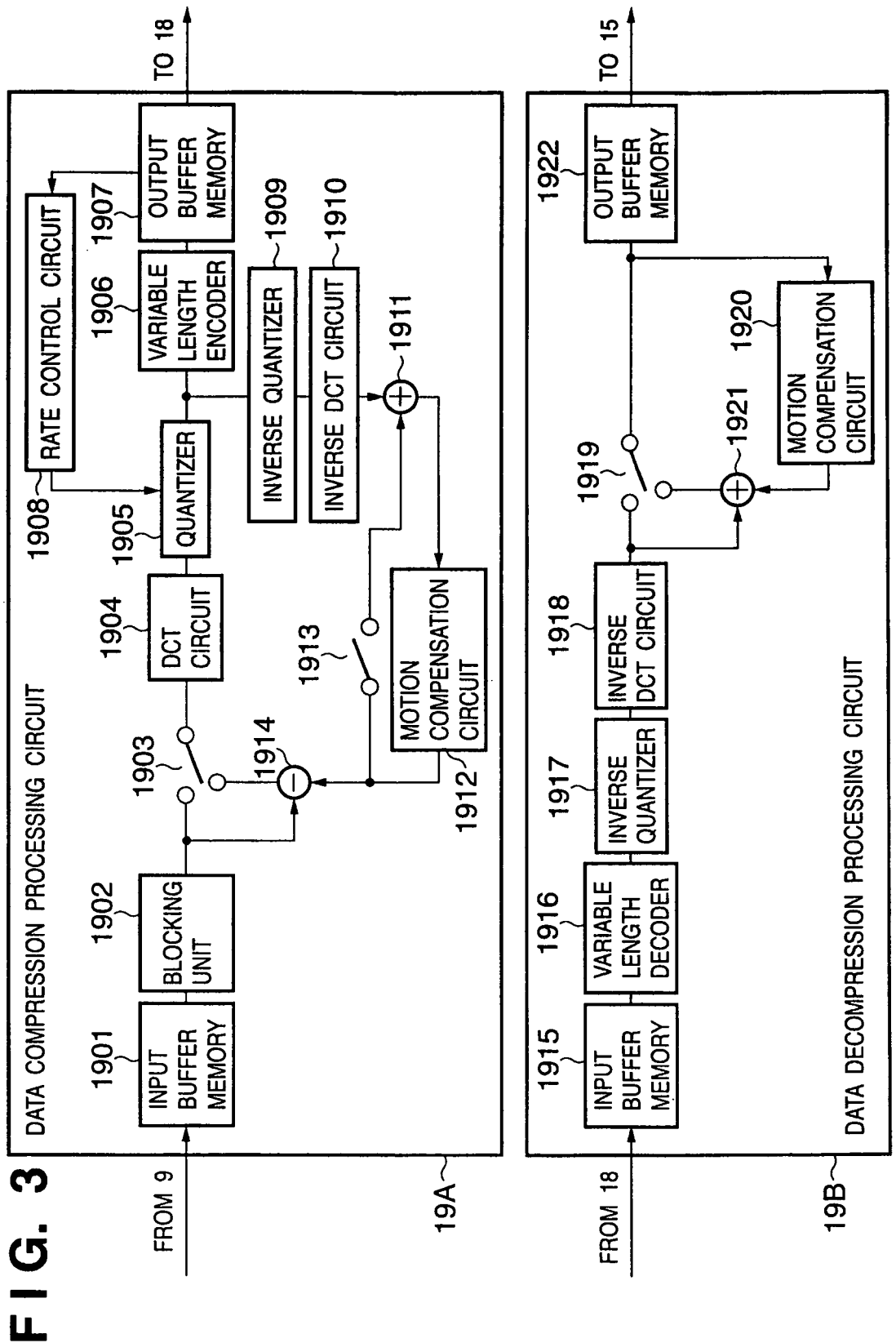
FIG. 3 is a block diagram representing an example of the internal configuration of a compression/decompression circuit in FIG. 1.

An output from the YCNR circuit 912 is also sent to the compression/decompression processing unit 19 through the data bus 14. FIG. 3 shows an example of the configuration of the compression/decompression processing unit 19. In this embodiment, an explanation will be given on the assumption that the compression/decompression processing unit 19 performs MPEG-based compression/decompression processing. Compression/decompression processing based on another compression method may be performed instead.

The compression/decompression processing unit 19 is composed of a data compression processing circuit 19A and a data decompression processing circuit 19B.

Image data input from the YCNR circuit 912 to be compressed is accumulated in an input buffer memory 1901 in the data compression processing circuit 19A. After that, a blocking circuit 1902 divides the image data stored in the input buffer memory 1901 into blocks of a predetermined size (e.g., 8×8 pixels). A DCT circuit 1904 performs discrete cosine transform (DCT) on each of blocks of image data input through a switch 1903 and outputs a DCT coefficient. The switch 1903 is switched depending on whether input image data is an I-picture or any other picture. The switch 1903 selects an output from the blocking circuit 1902 in the case of an I-picture and selects an output from a subtracter 1914 in the case of any other picture, a B-picture or P-picture.

A quantizer 1905 quantizes a DCT coefficient output from the DCT circuit 1904 using a quantization step set by a rate control circuit 1908 and outputs the result as a quantization coefficient. A variable length encoder (VLC) 1906 converts the quantization coefficient output from the quantizer 1905 into a variable length code. An output buffer memory 1907 temporarily stores the variable length code output from the VLC 1906.

An inverse quantizer 1909 and an inverse DCT circuit 1910 constitute a local decoder. The local decoder sequentially performs inverse quantization and inverse DCT processing for a quantization coefficient output from the quantizer 1905 and obtains a locally decoded block. A motion compensation circuit 1912 receives the locally decoded block output from the inverse DCT circuit 1910 through an adder 1911 and outputs a corresponding macroblock in a predetermined frame (former one of two frames, the latter frame, or an interpolating frame between them). A switch 1913 is closed except when an I-picture is processed.

The subtracter 1914 subtracts an output from the motion compensation circuit 1912 from an output from the blocking circuit 1902. In the case of a picture other than an I-picture, the difference value (motion compensation error) is input to the DCT circuit 1904 through the switch 1903 and subjected to encoding.

The rate control circuit 1908 controls the amount of codes by changing the quantization step of the quantizer 1905 on the basis of space occupied by codes in the output buffer memory 1907.

An output from the output buffer memory 1907 is sent to a recording/reproduction processing unit 18 (FIG. 1) through the data bus 14. The recording/reproduction processing unit 18 converts the received data into a format suitable for recording on a recording medium 20 such as a memory card, optical/magnetooptical disk, or magnetic tape and records the data on the recording medium 20.

At the time of reproduction, the recording/reproduction processing unit 18 converts data read from the recording medium 20 into a format suitable for later data decompression processing and sends it to the compression/decompression processing unit 19 through the data bus 14.

The data decompression processing circuit 19B in the compression/decompression processing unit 19 temporarily stores encoded data reproduced by the recording/reproduction processing unit 18 in an input buffer memory 1915. A variable length decoder (VLD) 1916 sequentially reads the encoded data from the input buffer 1915 and subjects it to variable length decoding. An inverse quantizer 1917 inversely quantizes the data decoded by the VLD 1916. An inverse DCT circuit 1918 performs inverse DCT on the data inversely quantized by the inverse quantizer 1917 and converts it into data in the spatial domain. A motion compensation circuit 1920 receives the data through a switch 1919 and outputs a difference value for motion compensation. An adder 1921 adds the difference value output from the motion compensation circuit 1920 to an output from the inverse DCT circuit 1918.

Note that the switch 1919 selects an output from the inverse DCT circuit 1918 in the case of an I-picture and selects an output from the adder 1921 in the case of a B- or P-picture. An output from the switch 1919 which is decoded data is temporarily stored in an output buffer 1922, restored to the original spatial arrangement, and output as image data of one frame.

An output from the output buffer memory 1922 is sent to the selector 15 (FIG. 1) through the data bus 14. An output from the selector 15 is converted into an analog signal by the digital-analog (DA) converter 16 (FIG. 1) and then displayed on the monitor 17.

(Region Categorization Processing)

As described above, an output from the LPF 903 of the camera signal processing unit 9 is sent to the AF preprocessing circuit 10, AE preprocessing circuit 11, motion vector detection circuit 12, and contour closed region detection circuit 13. Each of the circuits determines a region in an input image as a region of interest or a region of non-interest by a criterion specific to the circuit on the basis of luminance signals of an input image.

Figure 4A:
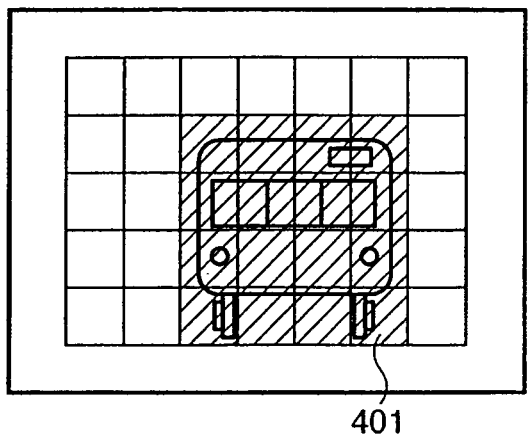
FIGS. 4A to 4D are charts representing division of video signals into blocks and examples of a region of interest and a region of non-interest according to the first embodiment.

The AF preprocessing circuit 10 divides video signals, which are outputs from the LPF 903, into a plurality of blocks, as shown in FIG. 4A. The AF preprocessing circuit 10 generates an evaluation value necessary for AF for each of the blocks and sends it to the main control unit 22. Any evaluation value may be used as one necessary for autofocus control. The focus information of a multipoint ranging frame can be used. More specifically, it is possible to use a TE/FE peak evaluation value, TE line peak integral evaluation value, or FE line peak integral evaluation value, as shown in, e.g., Japanese Patent Laid-Open No. 6-268896.

The main control unit 22 determines on the basis of an evaluation value acquired from the AF preprocessing circuit 10 whether a block in question is in focus. For example, if a subject 401 is in focus in FIG. 4A, the main subject is the subject 401. In FIG. 4A, hatched blocks containing the subject 401 are determined as regions of interest (blocks of interest), and blocks (in white) not containing the subject 401 are determined as regions of non-interest (blocks of non-interest).

Figure 4B:
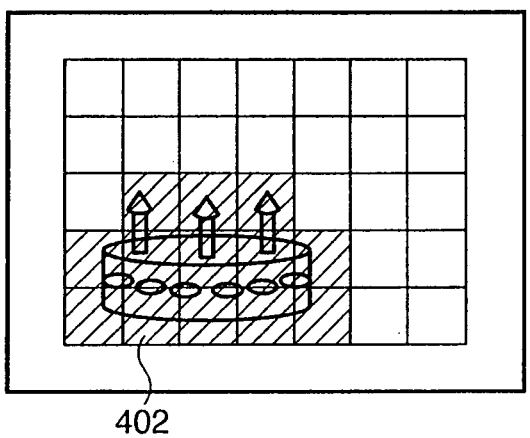

The AE preprocessing circuit 11 divides video signals, which are outputs from the LPF 903, into a plurality of blocks, as shown in FIG. 4B. The AE preprocessing circuit 11 generates an evaluation value necessary for AE for each of the blocks and sends it to the main control unit 22. An evaluation value necessary for autoexposure control is not particularly limited. For an example, it is possible to use, as an AE evaluation value, a data integration value within a detection frame, as shown in Japanese Patent Laid-Open No. 6-86147. The main control unit 22 determines from the acquired evaluation value whether the luminance level of a block in question is appropriate.

If the exposure is adjusted to be appropriate for a subject 402 in FIG. 4B, the main subject is the subject 402. In FIG. 4B, blocks containing the subject 402 (hatched) are determined as regions of interest, and blocks (in white) not containing the subject 402 are determined as regions of non-interest.

Figure 4C:
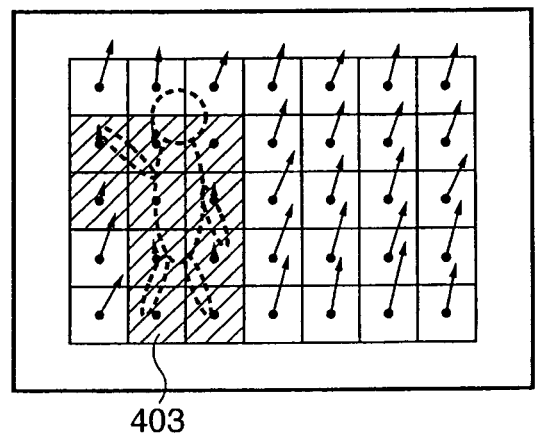

The motion vector detection circuit 12 divides video signals, which are outputs from the LPF 903, into a plurality of blocks, as shown in FIG. 4C. The motion vector detection circuit 12 calculates a motion vector for each of the blocks and sends it to the main control unit 22. A motion vector calculation method is not particularly limited. For example, a method of performing a matching operation on the result of binarizing components of a predetermined spatial frequency can be used.

If a subject 403 in FIG. 4C is the main subject, a photographer performs shooting such that the motion of the subject 403 stops. Accordingly, the main control unit 22 determines hatched blocks containing the subject 403 in FIG. 4C whose motion vectors are small as regions of interest and blocks (in white) whose motion vectors are large as regions of non-interest.

The contour closed region detection circuit 13 detects a closed region enclosed by a contour from video signals, which are outputs from the LPF 903. The contour closed region detection circuit 13 sends, to the main control unit 22, a determination signal indicating whether a block in question is within or outside the closed region together with block information shown in FIG. 4D. A closed region extraction method is not particularly limited. For example, it is possible to use a method of determining the edge direction (any of the first to fourth edge directions) of each of pixels (edge pixels)

constituting the contour and determining pixels located at points where any lines extending from the edge pixels in their edge directions intersect as pixels within the closed region.

Figure 4D:
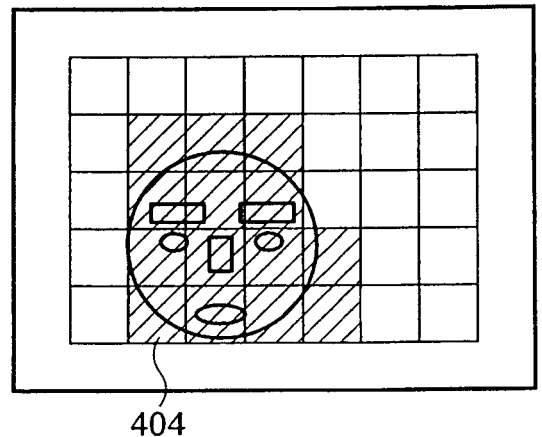

The main control unit 22 determines hatched blocks containing the detected closed region with a subject 404 in FIG. 4D as regions of interest and blocks (in white) not containing the closed region as regions of non-interest. If a contour signal is used to determine whether a region in question is a region of interest or a region of non-interest, only blocks containing the contour of the main subject are determined as regions of interest. On the other hand, if a contour closed region signal is used to determine whether a region in question is a region of interest or a region of non-interest, blocks containing the entire main subject are determined as regions of interest. For this reason, in the latter case, selective processing can be performed for all of the regions containing the main subject. This results in suppression of a deterioration of the image quality of all the regions.

Four methods have been explained as examples of a method of determining and categorizing a region as a region of interest or a region of non-interest. If determination and categorization can be performed by signal processing before encoding, any other method can be used.

There are other methods of determining a main subject using motion vectors than determining a block whose motion vector is small as a region of interest. For example, the motion vector of the entire image (the amount by which a photographer moves) may be calculated from the motion vector of each block, and a block which has a motion vector approximate to that of the entire image may be determined as a region of interest.

One of these methods may be used or two or more of them may be used in combination. If two or more are used in combination, it is possible to appropriately set the relationship between regions determined as regions of interest by the methods and regions finally determined as regions of interest.

For example, a region determined as a region of interest by any of the methods or all the methods may be finally determined as a region of interest. Alternatively, a region determined as a region of interest by each method may be weighted, and a region having a weight equal to or larger than a threshold value may be finally determined as a region of interest.

(Control of Camera Signal Processing Unit 9 by Main Control Unit 22)

Figure 5:
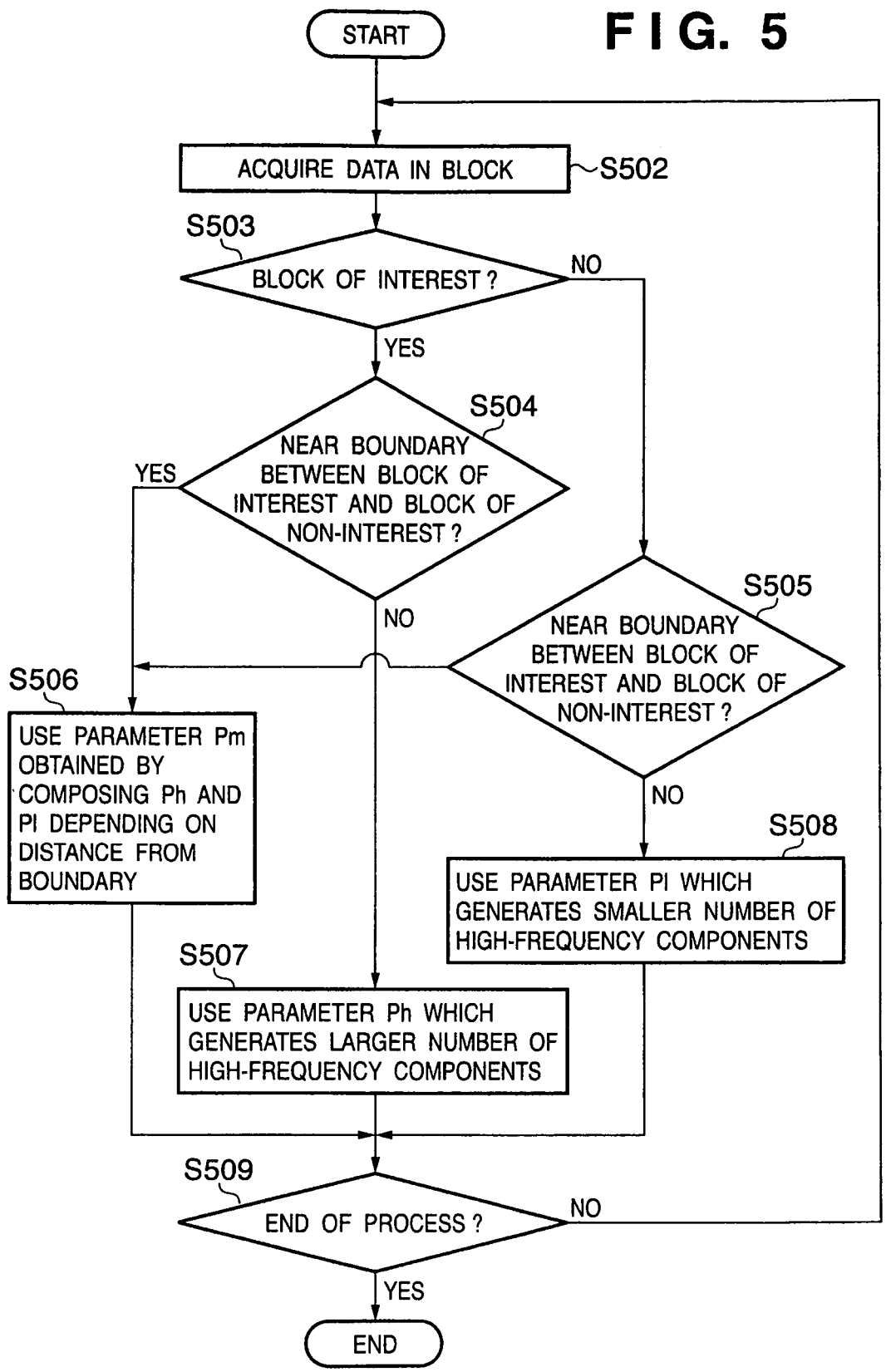
FIG. 5 is a flowchart representing camera signal processing control operation according to the first embodiment.

A method of controlling the camera signal processing unit 9 by the main control unit 22 in the digital video camera of this embodiment will be explained next using a flowchart shown in FIG. 5.

In this embodiment, a subject in a region of interest is considered to be an object which a photographer particularly wishes to record. Accordingly, compression encoding processing is performed while leaving a larger amount of temporal and spatial high-frequency components in a region of interest than those in a region of non-interest. More specifically, the amount of high-frequency components in a signal to be subjected to compression encoding processing is made larger in a region of interest than in a region of non-interest. With this operation, at the time of compression encoding, a larger amount of codes are allocated to a region of interest, and a smaller amount of codes are allocated to a region of non-interest. This makes it possible to obtain a compression encoding result in which a deterioration of image quality caused by compression encoding is visually imperceptible, i.e., which has high image quality while maintaining the total amount of codes (satisfying a target bit rate).

For this reason, in this embodiment, the main control unit 22 controls signal processing parameters of the camera signal processing unit 9, thereby controlling the amount of high-frequency components contained in a signal output from the camera signal processing unit 9. A signal in a region of interest is controlled such that it contains a larger amount of high-frequency components than a signal in a region of non-interest. With this control, at the time of compression encoding, a larger amount of codes are allocated to a region of interest, and a high image quality compression encoding result is realized.

First, the main control unit 22 acquires, for each of blocks divided as shown in FIGS. 4A to 4D, evaluation values output from the AF preprocessing circuit 10, AE preprocessing circuit 11, motion vector detection circuit 12, and contour closed region detection circuit 13 in FIG. 1 through the data bus 14 (S502). In S503, the main control unit 22 determines whether the current block satisfies the above-described block-of-interest determination conditions such as whether the current block is in focus, whether it is optimally exposed, whether its motion vector value is small, and whether it is within a contour closed region. On the basis of this, the main control unit 22 determines whether it is a block of interest. At this time, the determination may be made using all of outputs from the AF preprocessing circuit 10, AE preprocessing circuit 11, motion vector detection circuit 12, and contour closed region detection circuit 13 or using some of the four outputs.

The main control unit 22 determines (in S504 if it is determined that the current block is a region of interest or in S505 if it is determined that the current block is a region of non-interest) whether video signals being processed by the camera signal processing unit 9 are near the boundary between a region of interest and a region of non-interest. The determination is made because if a region of interest and a region of non-interest are made to drastically differ in signal processing, there appears something visually unnatural at the boundary between the region of interest and the region of non-interest.

If it is determined in S503 and S504 that the current block is a region of interest and not near the boundary between a region of interest and a region of non-interest, the main control unit 22 performs the following control in S507. More specifically, the main control unit 22 sets a parameter set Ph in the camera signal processing unit 9 such that a signal output from the camera signal processing unit 9 (signal output from the YCNR circuit 912) contains a larger amount of high-frequency components than a signal in a region of non-interest.

For example, the passband edge frequency fyl in the low pass circuit (LPF) 903 in FIG. 2 is set to be high but not so high as to cause chrominance carrier components to represent as many high-frequency components as possible of a luminance signal in a region of interest. Also, the band fyh of contour (edge) components detected by the contour component detection circuit 904 is set to be high such that high-frequency components of a region of interest do not become blurred when displayed on the monitor 17. As for chrominance signals, the passband edge frequency fcl of the LPFs 908 and 909 is set to be high but not so high as to cause aliasing to represent high-frequency components in a region of interest.

A large amount of codes are allocated on the time axis such that a motion becomes smooth in a region of interest. As for a region of interest, the RAW data NR circuit 901 and YCNR circuit 912 set the cyclic coefficients level1 and level2 and threshold values th1 and th2 to be small but not so small as to make residual noise noticeable. This prevents any lag and reduces the correlation on the time axis, thereby allocating a large amount of codes at the time of compression encoding.

As described above, in S507, the main control unit 22 generates the parameter set Ph, which causes the camera signal processing unit 9 to generate a signal having a large amount of high-frequency components left, in the camera signal processing unit 9. The main control unit 22 controls components output from the camera signal processing unit 9 using the parameter set Ph. With this operation, a large amount of codes are allocated to a region of interest at the time of compression in the data compression processing circuit 19A.

If it is determined in S503 and S505 that the current block is a region of non-interest and not near the boundary between a region of interest and a region of non-interest, the main control unit 22 performs the following control in S508. More specifically, the main control unit 22 sets a parameter set Pl in the camera signal processing unit 9 such that a signal output from the camera signal processing unit 9 (signal output from the YCNR circuit 912) contains a smaller amount of high-frequency components than a signal in a region of interest.

For example, the passband edge frequency fyl in the low pass circuit (LPF) 903 in FIG. 2 is set to be low such that a small amount of codes are allocated at the time of compression encoding. A sufficient amount of codes are allocated to a region of interest in exchange for the reduction in the amount of codes.

Even if the band fyh of contour (edge) components detected by the contour component detection circuit 904 is set to be low, since the current block is not a region of interest, blurring of high-frequency components when displayed on the monitor 17 is hardly noticed. As for chrominance signals as well, the passband edge frequency fcl of the LPFs 908 and 909 is set to be low, and codes are not allocated at the time of compression. A sufficient amount of codes are allocated to chrominance components of a region of interest in exchange for the reduction in the amount of codes.

In a region of non-interest, the correlation on the time axis may be increased, and information at the time of encoding may be reduced. Accordingly, as for a region of non-interest, the RAW data NR circuit 901 and YCNR circuit 912 set the cyclic coefficients level1 and level2 and threshold values th1 and th2 to be large. This increases the effect of reducing noise and the correlation on the time axis, thereby reducing information at the time of encoding.

As described above, in S508, the main control unit 22 generates the parameter set Pl, which causes the camera signal processing unit 9 to generate a signal having a small amount of high-frequency components, in the camera signal processing unit 9. The main control unit 22 controls components output from the camera signal processing unit 9 using the parameter set Pl. With this operation, compression encoding of a region of non-interest is performed to have a small amount of codes. Even if a large amount of codes are allocated to a region of interest at the time of compression encoding in the data compression processing circuit 19A, a target data rate can be maintained.

If it is determined in S504 and S505 that the video signals being processed by the camera signal processing unit 9 are near the boundary between a region of interest and a region of non-interest, the main control unit 22 generates a parameter Pm obtained by composing the parameter sets Ph and Pl depending on the distance from the boundary in S506.

Figure 6:
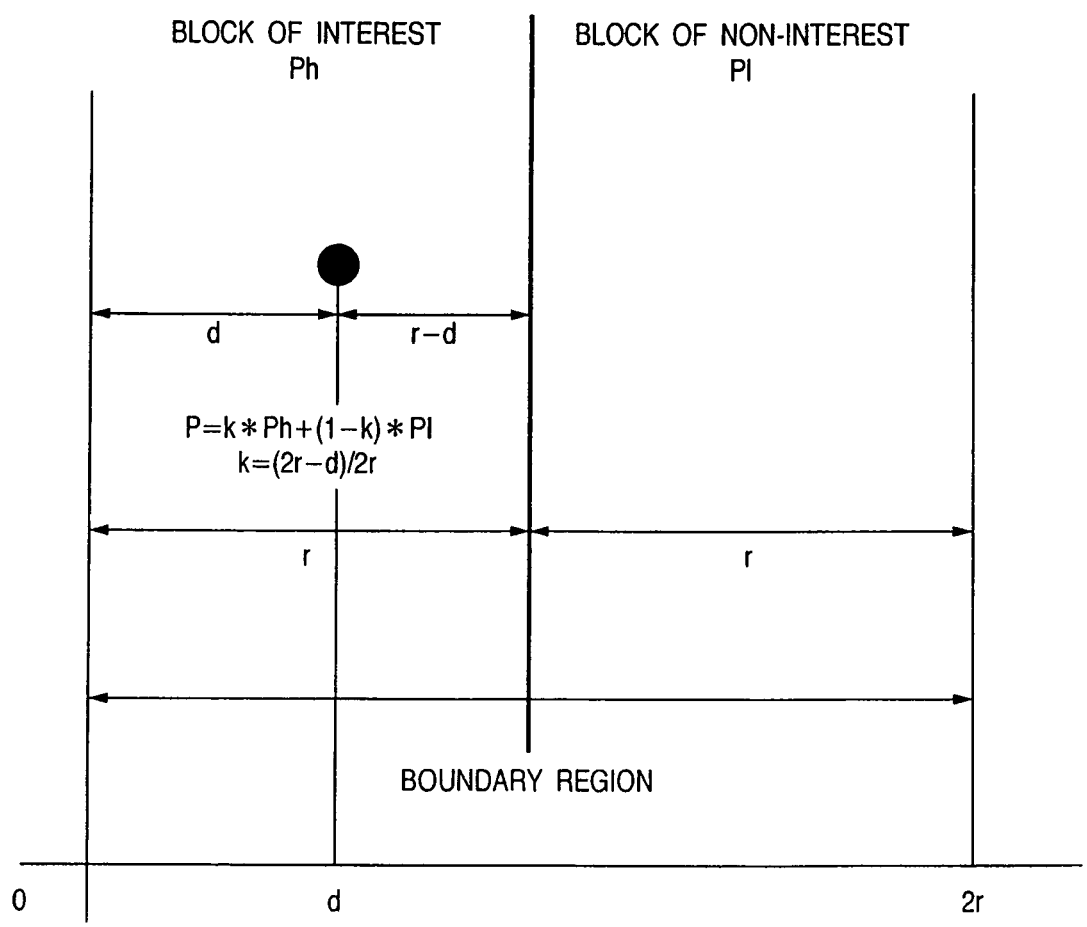
FIG. 6 is a chart for explaining the principle of calculation of a parameter in a boundary region.

Generation of the parameter Pm will be explained using FIG. 6. Assume that a region considered to be "near a boundary" in each of a region of interest and a region of non-interest adjacent to each other extends from the boundary between them and has a width of r. That is, a boundary region is a region which extends about the boundary and has a width of 2r. In this region, the parameter Pm obtained by composing the parameter sets Ph and Pl.

The distance from a location separated by a distance of d from the beginning of the region "near the boundary" in the region of interest to the beginning of the region "near the boundary" in the region of non-interest is 2r−d. FIG. 6 shows a coordinate system which uses the beginning of the region "near the boundary" in the region of interest as the origin of the abscissa. In this coordinate system, the parameter Ph is used on an axis perpendicular to the abscissa at the origin while the parameter Pl is used on an axis perpendicular to the abscissa at a point 2r. As for the region between the axes, the parameter Pm is calculated as follows:

$$Pm = k*Ph + (1-k)*Pl \qquad \text{Formula 1}$$

(where $k=(2r-d)/2r$)

The calculated parameter Pm is sent to the camera signal processing unit 9. Actually, Formula 1 is used for setting the frequencies or in association with the parameters of the NR circuits in FIG. 2 shown in this embodiment.

After a parameter to be used is set in S506, S507, or S508, the main control unit 22 determines in S509 whether the end of the process. If the process continues, the flow returns to S502 to acquire evaluation value data of the next block; otherwise, the flow jumps to S510.

Note that calculation of the distance from a boundary is implemented by counting video signals on the screen by a counter (not shown).

As has been explained above, according to this embodiment, video signals which are outputs from an image-sensing device such as a CCD are divided into blocks of a predetermined number of pixels. Each of the blocks is categorized as a region of interest or a region of non-interest on the basis of the degree of focus, motion vector, luminance distribution, and the like of the block. Control of a spatial correlation (high-frequency components) such as a luminance band, contour correction band, or chrominance band and temporal correlation control such as cyclic NR are performed depending on whether a block in question is a block of interest or a block of non-interest.

More specifically, for a region of interest, camera signal processing is performed to leave high-frequency components larger in amount than those in a region of non-interest, and control is performed such that the temporal correlation is reduced. For a region of non-interest, control is performed such that high-frequency components are reduced in amount. With this operation, at the time of compression encoding, a larger amount of codes are allocated to a region of interest, and a smaller amount of codes are allocated to a region of non-interest. Accordingly, the effect of achieving a target rate and high image quality at the same time can be obtained.

Whether a region in question is a region (block) of interest or a region (block) of non-interest is determined using camera evaluation values such as focus information and luminance signal distribution information which a normal image-sensing apparatus uses in autofocus control and autoexposure control. Thus, it is advantageously unnecessary to specially add a new configuration.

Second Embodiment

A second embodiment will be explained next. In the first embodiment, the main control unit 22 sets the parameter sets Ph and Pl in the camera signal processing unit 9 such that there is a difference in the amount of high-frequency components. The specifics of the difference may be arbitrarily determined. In this embodiment, a difference between parameter sets Ph and Pl, i.e., a difference in high-frequency components in an output from a camera signal processing unit is adjusted depending on a depth of field, thereby performing finer image quality control.

A digital video camera according to this embodiment may have a configuration and basic operation in common with the first embodiment. For this reason, only the operation related to how to determine the difference between the parameter sets Ph and Pl will be explained here.

Figure 7:
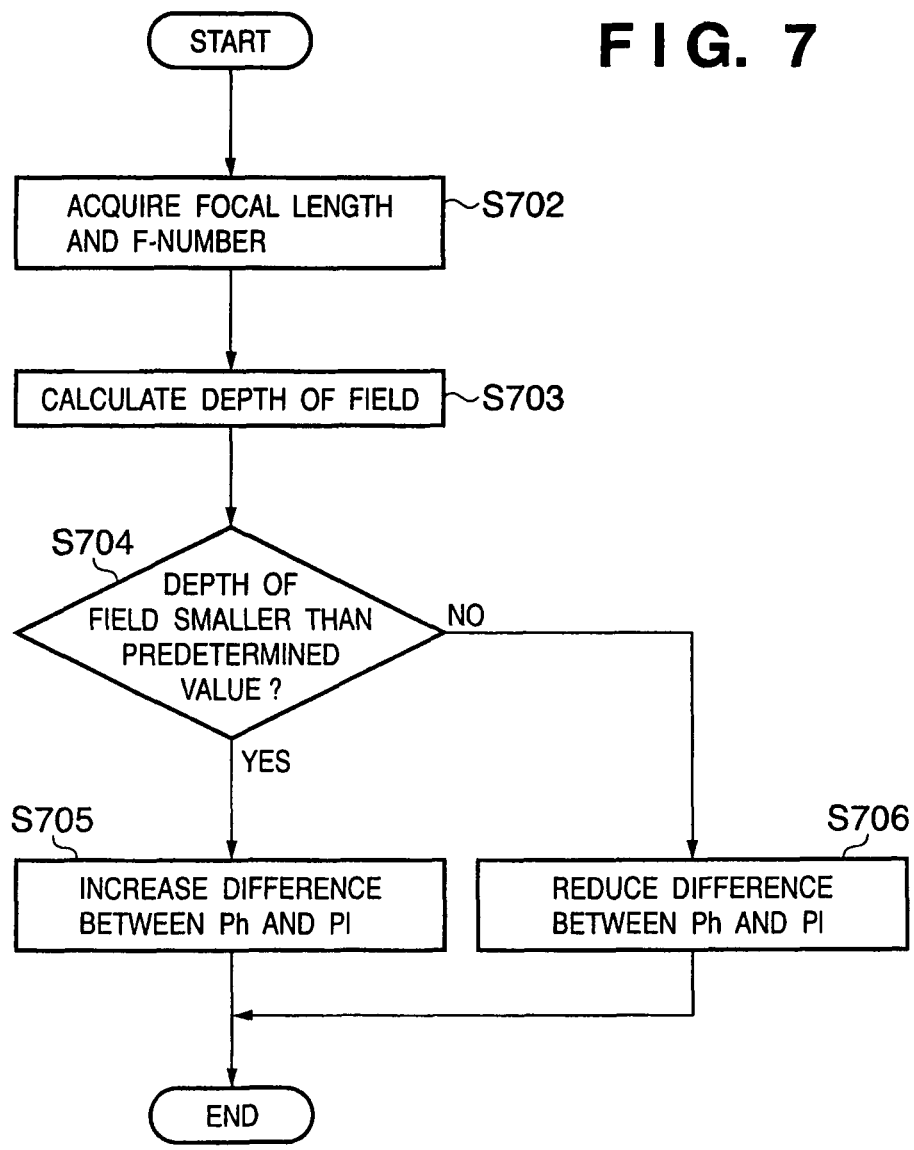
FIG. 7 is a flowchart representing operation for determining a difference between parameter sets Ph and Pl according to a second embodiment.

FIG. 7 is a flowchart for explaining the operation of determining the difference between the parameter sets Ph and Pl in the digital video camera according to this embodiment. The operation is executed for, e.g., each frame of an image. The execution result is applied in common to all blocks within the frame at the time of encoding processing.

In S702, a lens control unit 4 sends a focal length (zoom factor) and F-number from a zoom encoder 1D and an iris encoder 2D, respectively. In S703, a depth of field is calculated using a correspondence table between focal lengths and depths of field for each of F-numbers prepared in advance. Examples of such a correspondence table can include a table converted from a graph shown in Japanese Patent Laid-Open No. 2003-337280 (FIG. 2).

Generally, the more an iris 2A is open, and the smaller an F-number is or the nearer a zoom lens 1A is located to the telephoto end, the smaller the depth of field is. In this case, a main subject in focus stands out. Conversely, the more the iris 2A is stopped down, and the larger the F-number is or the nearer the zoom lens 1A is located to the wide angle end, the larger the depth of field is. In this case, even if a main subject is brought into focus, an object before or behind the main subject is in focus to some extent.

In S704, it is determined whether the depth of field is smaller than a predetermined value. If the depth of field is smaller, it is determined that an object other than the main subject is almost out of focus. For this reason, removal of a considerable amount of spatial and temporal high-frequency components in a background portion poses no problem. In this case, compression by a data compression processing circuit 19A considerably reduces the amount of codes. In exchange for the reduction, the spatial and temporal high-frequency components of the main subject (regions of interest) can be emphasized, and the amount of codes for the main subject can be increased. Accordingly, when setting the parameters Ph and Pl in S705, the difference between them is increased.

On the other hand, if the depth of field is larger than the predetermined value, an object other than the main subject is in focus to some extent. When setting the parameters Ph and Pl in S706, the difference between them is reduced to ensure some level of quality for a region of non-interest.

A recent video equipment product is provided with the program AE function, which sets a shutter speed and aperture to predetermined values when shooting a subject in a particular situation. More specifically, there are modes such as a Portrait mode for clearly shooting a person or the like of all others by reducing a depth of field to make a subject stand out and a Surf & Snow mode for emphasizing brightness, e.g., on a beach in summer or a ski slope in winter. Accordingly, for the determination in S704 of FIG. 7 whether the depth of field is smaller or larger, a program AE mode may be acquired in S702 instead of calculating the focal length (zoom factor) and F-number. Whether the depth of field is smaller or larger may be uniquely determined depending on the mode. In this case, for example, it suffices that the difference between the parameter sets Ph and Pl be increased in a mode where the depth of field is small while the difference be reduced in a mode where the depth of field is large.

Other Embodiment

The present invention includes a case where functions equivalent to the functions of the above-described embodiments are achieved by supplying a software program which implements the functions of the embodiments to a system or apparatus having a computer which can execute the program directly from a recording medium or through the use of wired/wireless communication and executing the supplied program by the computer of the system or apparatus.

Therefore, a program code itself supplied and installed in a computer of an image-sensing apparatus to implement the functional processing of the present invention using the computer implements the present invention. That is, the present invention includes a computer program itself for implementing the functional processing of the present invention.

In this case, the form of the program is not particularly limited, and an object code, a program to be executed by an interpreter, script data to be supplied to an OS, or the like may be used as long as it functions as a program.

As a recording medium for supplying a program, for example, a magnetic recording medium such as a flexible disk, hard disk, or magnetic tape, an optical/magnetooptical storage medium such as an MO, CD-ROM, CD-R, CD-RW, DVD-ROM, DVD-R, or DVD-RW, a nonvolatile semiconductor memory, or the like may be used.

Examples of a program supply method using wired/wireless communication include a method of storing, in a server on a computer network, a computer program itself forming the present invention or a data file (program data file) such as a compressed file containing an automatic installation function which can serve as a computer program forming the present invention on a client computer and downloading the program data file to a client computer connecting thereto. In this case, the program data file may be divided into a plurality of files, and the divided files may be arranged on different servers.

That is, the present invention includes a server apparatus which makes a plurality of users download a program data file required to implement the functional processing of the present invention by a computer.

The functional processing can also be implemented by delivering a storage medium such as a CD-ROM storing an encrypted program of the present invention to users, supplying key information for decryption to a user who meets a predetermined condition by allowing him/her to download the key information from a home page via the Internet, and executing the encrypted program using the key information to be installed in a computer.

The functions of the embodiments may be implemented not only by executing a read-out program by a computer but also by some or all of actual processes executed by an OS or the like running on the computer in accordance with an instruction of the program.

The functions of the embodiments may be implemented by some or all of actual processes executed in accordance with an instruction of a program read out from a recording medium by a CPU or the like arranged in a function extension board or a function extension unit which is inserted in or connected to a computer, after the program is written in a memory of the extension board or unit.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-190503, filed on Jun. 29, 2005 which is hereby incorporated by reference herein in its entirety.

What is claimed is:

1. An image-sensing apparatus comprising:
a signal processing unit adapted to apply predetermined signal processing to a sensed frame image and outputs processed image data;
an encoding unit adapted to encode the processed data output from said signal processing unit;
a generation unit adapted to divide the sensed frame image into a plurality of blocks and to generate evaluation values for each of the plurality of blocks, wherein the evaluation values are used in autofocus control of the image sensing apparatus;
a categorization unit adapted to categorize in-focused blocks of the sensed frame image as one of a block of interest and categorize out-of-focused blocks of the sensed frame image as one of a block of non-interest on the basis of the evaluation values of the sensed frame image; and
a control unit adapted to control the signal processing applied by said signal processing unit on the basis of a categorization result obtained from said categorization unit,
wherein when the sensed frame image is processed by the signal processing apparatus, said control unit controls the signal processing such that, for each of the plurality of blocks, image data contained in the block of interest has a larger amount of high-frequency components left which are related to the amount of codes in the encoding than image data contained in the block of non-interest,
wherein said signal processing unit comprises a cyclic type noise reduction circuit, and
said control unit controls the cyclic type noise reduction circuit such that a temporal correlation for the block of interest becomes low.

2. The image-sensing apparatus according to claim 1, wherein said categorization unit detects a luminance signal level for each of the plurality of blocks and categorizes each of the plurality of block as one of the block of interest and the block of non-interest on the basis of the detected luminance signal level.

3. The image-sensing apparatus according to claim 1, further comprising
a closed region detecting unit adapted to detects a closed region enclosed by a contour contained in the sensed frame image and,
wherein
said categorization unit categorizes block(s) which contains the closed region as the block of interest and block(s) which does not contain the closed region as the block of non-interest.

4. The image-sensing apparatus according to claim 1, wherein
said signal processing unit comprises a low pass filter for one of a color difference signal and a luminance signal, and
said control unit controls a frequency characteristic of the low pass filter.

5. The image-sensing apparatus according to claim 1, wherein
said signal processing unit comprises a contour detection unit which uses a high pass filter, and
said control unit controls a frequency characteristic of the high pass filter.

6. The image-sensing apparatus according to claim 1, wherein said control unit controls the signal processing by giving a control parameter for the block of interest and a control parameter for the block of non-interest to said signal processing unit.

7. The image-sensing apparatus according to claim 6, wherein said control unit controls the signal processing near a boundary between the block of interest and the block of non-interest using a control parameter generated from the control parameter for the block of interest and the control parameter for the block of non-interest.

8. The image-sensing apparatus according to claim 6, further comprising
a depth-of-field calculation unit adapted to calculate a depth of field, wherein
said control unit increases a difference between the control parameter for the block of interest and the control parameter for the block of non-interest with a reduction in the calculated depth of field.

* * * * *